United States Patent [19]
Sasaki et al.

[11] Patent Number: 5,515,273
[45] Date of Patent: May 7, 1996

[54] SYSTEM AND METHOD FOR CONTROLLING DAMPING FORCE CHARACTERISTIC OF SHOCK ABSORBER OF VEHICLE

[75] Inventors: Mitsuo Sasaki; Makoto Kimura, both of Atsugi, Japan

[73] Assignee: Unisia Jecs Corporation, Japan

[21] Appl. No.: 199,880

[22] Filed: Feb. 22, 1994

[30] Foreign Application Priority Data

Feb. 23, 1993 [JP] Japan .................................. 5-032891

[51] Int. Cl.$^6$ .................................. B60G 17/06
[52] U.S. Cl. .................... 364/424.05; 280/707; 280/840; 280/DIG. 1
[58] Field of Search ............... 364/424.05; 280/840, 280/707, DIG. 1; 188/275, 281, 282

[56] References Cited

U.S. PATENT DOCUMENTS

| | | | |
|---|---|---|---|
| 4,696,489 | 9/1987 | Fujishiro et al. | 280/707 |
| 4,887,699 | 12/1989 | Ivers et al. | 280/707 X |
| 4,898,264 | 2/1990 | Miller | 188/275 |
| 4,921,272 | 5/1990 | Ivers | 280/707 |
| 4,936,425 | 6/1990 | Boone et al. | 280/707 X |
| 5,004,079 | 4/1991 | Ivers et al. | 188/282 |
| 5,088,760 | 2/1992 | Kakizaki et al. | 280/707 |
| 5,203,584 | 4/1993 | Butsuen et al. | 280/707 |
| 5,289,380 | 2/1994 | Kimura | 364/424.05 |
| 5,322,320 | 6/1994 | Sahashi et al. | 280/707 |

FOREIGN PATENT DOCUMENTS

| | | |
|---|---|---|
| 0215999 | 4/1987 | European Pat. Off. . |
| 4226050 | 2/1993 | Germany . |
| 61-163011 | 7/1986 | Japan . |
| 2234947 | 2/1991 | United Kingdom . |
| 2252603 | 8/1992 | United Kingdom . |
| 9315924 | 8/1993 | WIPO . |

*Primary Examiner*—Collin W. Park
*Attorney, Agent, or Firm*—Ronald P. Kananen

[57] ABSTRACT

A system and method for controlling a damping characteristic of at least one shock absorber for an automotive vehicle in which, when direction determining signs of both vertical sprung mass velocity (V) and relative velocity (Sv) between a sprung mass and an unsprung mass are the same, the variable control of the damping characteristic C is carried out at either of extension stroke side (V is plus and Sv is plus) or contraction stroke side (V is minus and Sv is minus) to provide $C=\alpha \cdot V/Sv$, and when the direction determining signs of both vertical sprung mass velocity (V) and relative velocity (Sv) between the sprung mass and the unsprung mass are mutually different, the variable control of the damping characteristic C is carried out at either of extension stroke side (V is plus and Sv is minus) or contraction stroke side (V is minus and Sv is plus) to provide $C=\alpha \cdot V$.

6 Claims, 11 Drawing Sheets

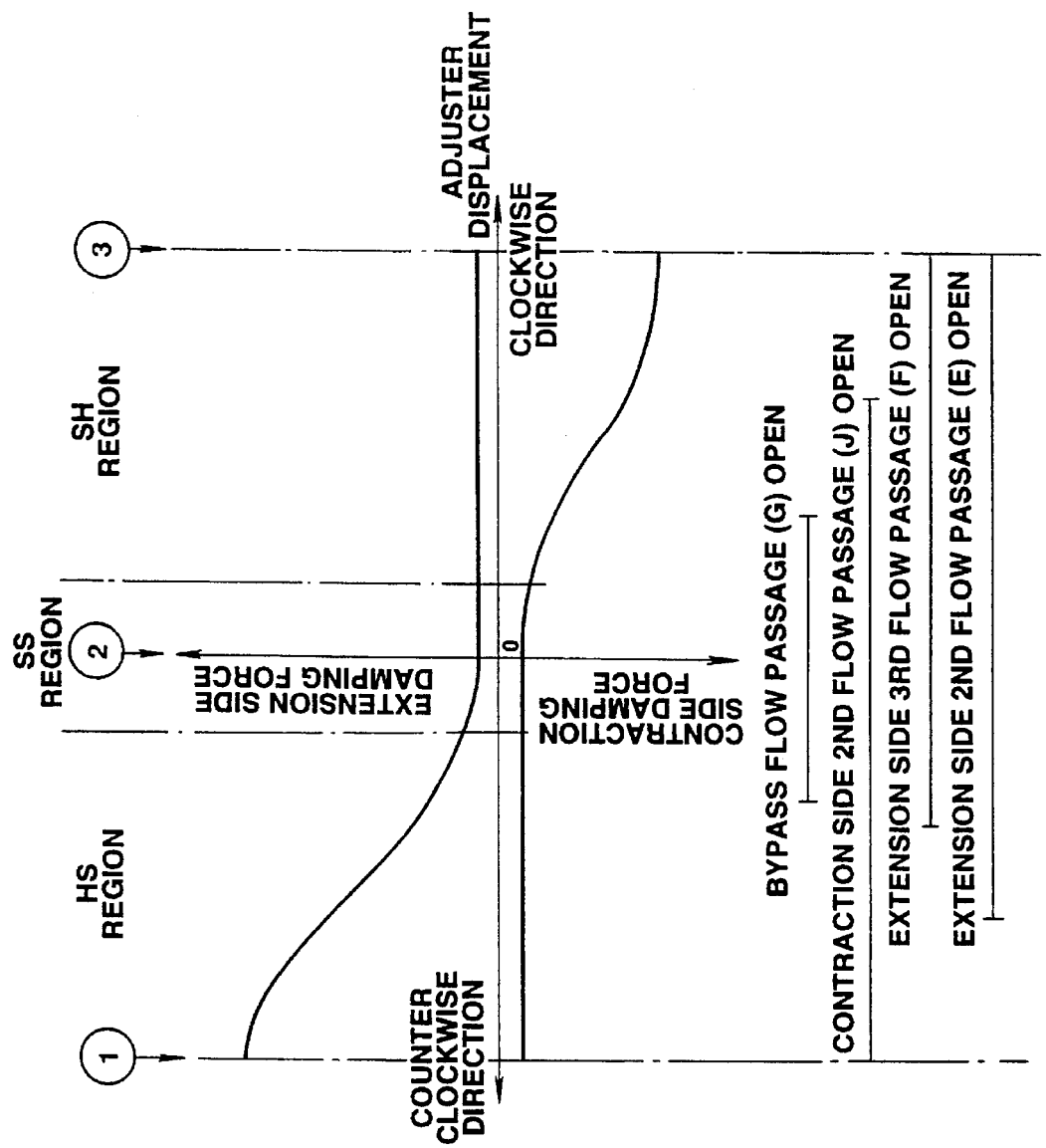

SYSTEM AND METHOD FOR CONTROLLING DAMPING FORCE CHARACTERISTIC OF SHOCK ABSORBER OF VEHICLE

BACKGROUND OF THE INVENTION

1. Field of The Invention

The present invention relates generally to a system and method for controlling damping force characteristics of respective shock absorbers of a vehicle, each shock absorber (also called a damper, but hereinafter referred to as the shock absorber) being interposed between an unsprung mass and sprung mass of the vehicle so as to provide an optimum damping force therefrom. The shock absorber is provided with varying means for varying the damping characteristic thereof at multiple stages in response to a drive signal.

2. Description of The Background Art

A Japanese Patent Application First Publication No. Showa 61-163011 published on Jul. 23, 1986 exemplifies a previously proposed damping characteristic controlling system for a vehicle.

In the disclosed Japanese Patent Application First Publication, a sprung mass vertical velocity and a relative velocity between sprung mass (vehicle body) and unsprung mass (tire wheel) are determined. When both velocities have mutually the same sign (both upward directions or both downward directions), the characteristics of the damping forces of the corresponding stroke side for any one or more shock absorbers are set to provide hard characteristics (HS or SH). When both velocities have the different signs (+ or −), the characteristics of the damping forces for the shock absorbers are set to provide soft characteristics. This setting operations are based on the damping force characteristic control called "Sky Hook" theory and carried out independently of four tire wheels.

That is to say, when, with the direction of the vertical velocity V being upward, the direction of the relative velocity Sv is switched from a contracted direction (minus) to an extended direction (plus), the damping characteristic is changed from a soft (low damping characteristic) to a hard (high damping characteristic). In an actual practice, a delay occurs at a rising of the damping force. Therefore, a lacking state of the damping force occurs at the initial stage of the switching of the damping characteristic. At the initial rising stage, the application of vibration to the vehicle body cannot sufficiently be suppressed.

In addition, when, with the direction of the relative velocity Sv in the extended direction (plus), the direction of the vertical sprung mass velocity is switched from the upward direction (plus) to the downward direction (minus), the damping characteristic is switched from the hard (high) damping characteristic to the soft (low) damping characteristic. However, since, in the actual practice, a response delay in the hydraulic (working fluid) in the shock absorber occurs, the damping force is not immediately reduced so that an excessive damping force occurs at the initial stage of switching of the damping force characteristic. Accordingly, the vibration suppression effect of the vehicle body cannot sufficiently be exhibited at this region of the initial stage of switching.

Furthermore, in the damping characteristic control based on the conventional "sky hook" theory, it is necessary to switch the damping characteristic by driving the actuator (namely, a pulse motor) whenever the coincidence or non-coincidence of both direction determining signs of the vertical sprung mass and vertical relative velocities is switched. Therefore, a control response characteristic becomes worsened and the number of times drives are provided to the actuators are increased, thereby the durability of the actuators being reduced.

SUMMARY OF THE INVENTION

It is, therefore, a principal object of the present invention to provide an improved system and method for controlling a damping characteristic for at least one shock absorber of an automotive vehicle which can eliminate a response delay of the damping characteristic when the damping characteristic is switched from either a low damping characteristic to a high damping characteristic and vice versa on a basis of a "Sky Hook" theory, which can improve a control response characteristic, and can assure a high durability of its actuator.

The above-described object can be achieved by providing a system for controlling a damping force for at least one shock absorber of an automotive vehicle, said shock absorber, interposed between a sprung mass of a vehicle body and unsprung mass of a corresponding one of its tire wheels, the system comprising: a) damping characteristic varying means, responsive to a drive signal input thereto, for variably changing one of damping force characteristics of either an extension stroke side or a contraction stroke side with the other damping force characteristic of either extension stroke side or contraction stroke side fixed to a low damping force characteristic side; b) first sensing means for deriving a magnitude and direction of a vertical sprung mass velocity with respect to a road surface on which the vehicle runs; c) second sensing means for deriving a relative velocity between the sprung mass and unsprung mass; and d) damping characteristic control means for determining whether the direction of the vertical sprung mass velocity is equal to that of the relative velocity between the sprung mass and unsprung mass and for providing the drive signal for the damping characteristic varying means to control the one damping force characteristic at either an extension stroke side or a contraction stroke side to a damping characteristic which is proportional to the magnitude of the vertical sprung mass velocity divided by the magnitude of the relative velocity when the direction of the vertical sprung mass speed is equal to that of the relative velocity and to a damping characteristic which is proportional to the magnitude of the vertical sprung mass velocity when the direction of the vertical sprung mass velocity is not equal to that of the relative velocity.

The above-described object can also be achieved by providing a method for controlling a damping force for at least one shock absorber of an automotive vehicle, said shock absorber, interposed between a sprung mass of a vehicle body and an unsprung mass of a corresponding one of its tire wheels, the method comprising the steps of: a) deriving a direction and magnitude of a vertical sprung mass velocity (V) and deriving a a direction and magnitude of a relative velocity between the sprung mass and unsprung mass (Sv); b) determining whether the direction of the vertical sprung mass velocity is equal to that of the relative velocity between the sprung mass and unsprung mass; c) controlling one of the damping characteristics of the shock absorber at either an extension stroke side or a contraction stroke side to a damping characteristic which is proportional to the vertical sprung mass velocity (V) divided by the relative velocity (Sv) between the sprung mass and unsprung mass when both directions of the vertical sprung mass velocity (V) and relative velocity (Sv) coincide with each other and to a damping characteristic which is proportional to the vertical sprung mass velocity (V) at the extension stroke side or contraction stroke side when the direction of the vertical sprung mass velocity does not coincide with that of the relative velocity; and d) maintaining the other damping characteristic of either extension and contraction stroke side at a low damping characteristic.

According to the present invention, when the direction determining sign of the vertical sprung mass velocity is plus (+), the damping characteristic at the extension stroke side is variably controlled and, on the other hand, that at the contraction stroke side is fixed to the low damping characteristic. When the direction determining sign of the vertical sprung mass velocity is minus (−), the damping characteristic at the contraction stroke side is variably controlled and, on the other hand, that at the extension stroke side is fixed to the low damping characteristic. Therefore, when the direction determining signs of both vertical sprung mass velocity and relative velocity coincide with each other, a vibration suppression force of the vehicle body is enhanced with the damping characteristic of the shock absorber at the instantaneous stroke side (if both are plus, the extension stroke side and, if both are minus, the contraction stroke side) and when the direction determining signs of both vertical sprung mass velocity and relative velocity are not coincident with each other, a vibration transmission force to the vehicle body (the application of vibration force to the sprung mass) can be weakened. Such a damping characteristic control based on the "Sky Hook" theory is carried out. The switching of the damping characteristic to the low damping characteristic direction is carried out without the newly added drive to the actuator (pulse motor). Therefore, the number of times the switching of the damping characteristic is less and control responsive characteristic can be enhanced. In addition, the durability of the actuator is improved.

Since at a point of time at which the direction of the vertical sprung mass velocity is switched, the variable control of the damping characteristic at one of the stroke sides opposite to the shock absorber stroke side is started, the switching position of the damping characteristic at the opposite stroke side is already transferred to a position near to the switching position of the damping characteristic in proportion to the value of the vertical sprung mass velocity at a stage at which the direction of the relative velocity is thereafter switched. Therefore, the sufficient vibration suppression effect from an initial time at which the relative velocity is switched can be exhibited.

In addition, since the relative velocity indicates zero when the direction of the relative velocity is switched, the value of the damping characteristic (in terms of calculation, infinite) is in a maximum hard (hardest) state. Thereafter, since the damping characteristic is thereafter started to be reduced and is reduced to a minimum soft (softest) damping characteristic, the sufficient application suppression of a vibration effect can be exhibited at the initial stage of switching of the direction of the vertical sprung mass velocity.

BRIEF DESCRIPTION OF THE DRAWINGS

FIG. 6 is a characteristic curve when an adjuster (40) of the shock absorber SA is pivoted in either a clockwise or a counterclockwise direction to a position corresponding to a stepped position of a pulse motor shown in FIG. 2 with a zero damping force point as a center.

DESCRIPTION OF THE PREFERRED EMBODIMENT

Reference will, hereinafter, be made to the drawings in order to facilitate a better understanding of the present invention.

Figure 1:
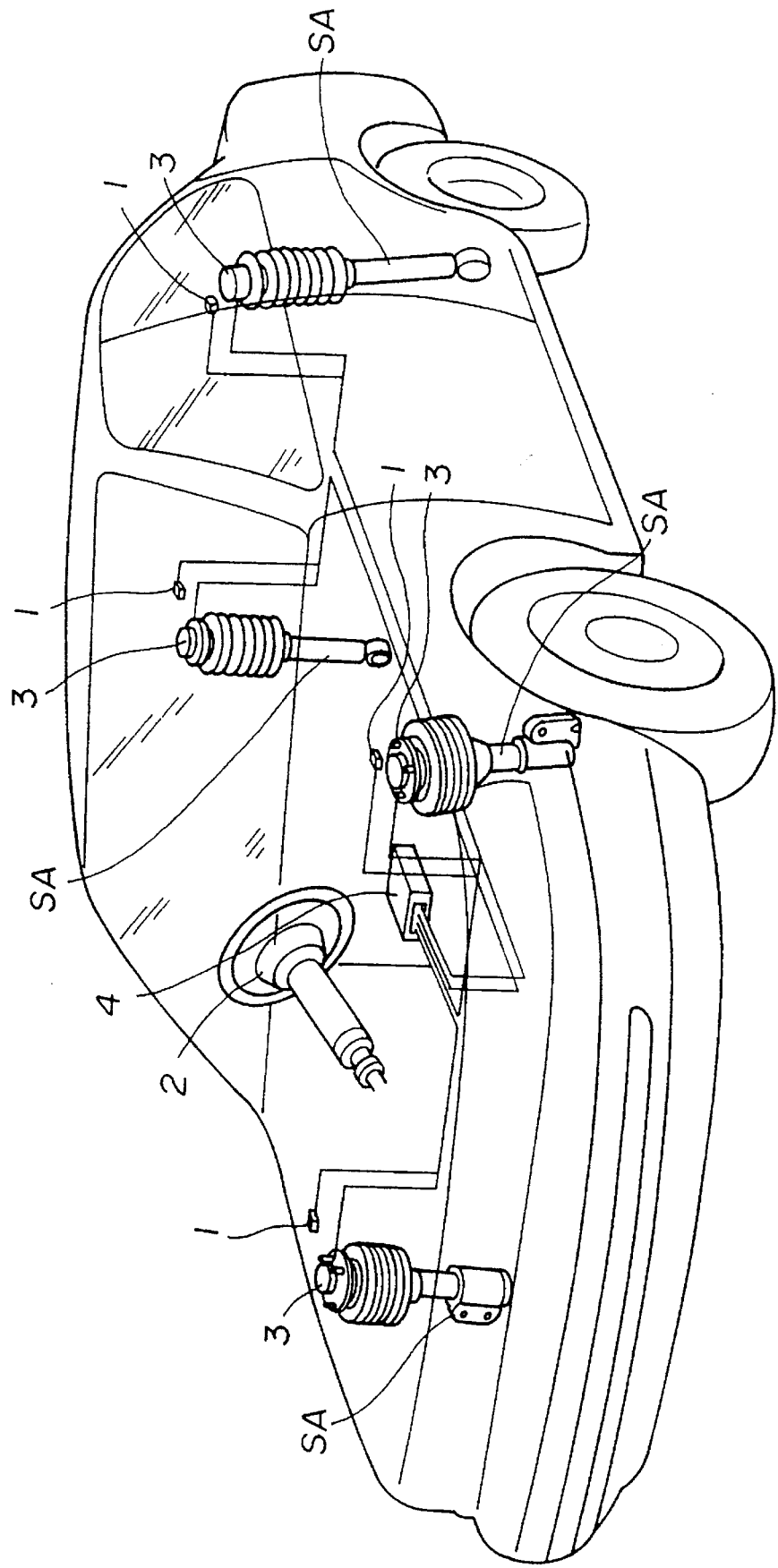
FIG. 1 is a schematic perspective view of a system for controlling a damping force characteristics for at least one shock absorber of a vehicle in a preferred embodiment according to the present invention.

FIG. 1 shows a structure of a system for controlling damping forces for respective shock absorbers in a preferred embodiment according to the present invention.

Four shock absorbers (suspension units) SA are interposed between respective parts of a vehicle body and respective four tire wheels. It is noted that SA denotes simply a representative shock absorber commonly used when each shock absorber is explained.

Four vertical sprung mass acceleration sensors 1 (so called, vertical G sensors) and four vehicular weight sensors 6 are installed on parts of the vehicle body adjacent the respective shock absorbers SA, namely, on parts of a vehicle body positioned in the proximities to mounting positions of front tire wheels, to detect vertical accelerations of the sprung mass at the front tire wheels and so as to detect relative displacements between the sprung mass and unsprung mass at the respective tire wheels, respectively.

A control unit 4 is installed on a part of the vehicle body which is placed in a proximity to a driver's seat and which receives output signals of each G sensor 1 and of vehicular weight sensors 6 and produces drive signals to stepping motors (also called pulse motors) 3 connected to respective shock absorbers SA.

Figure 2:
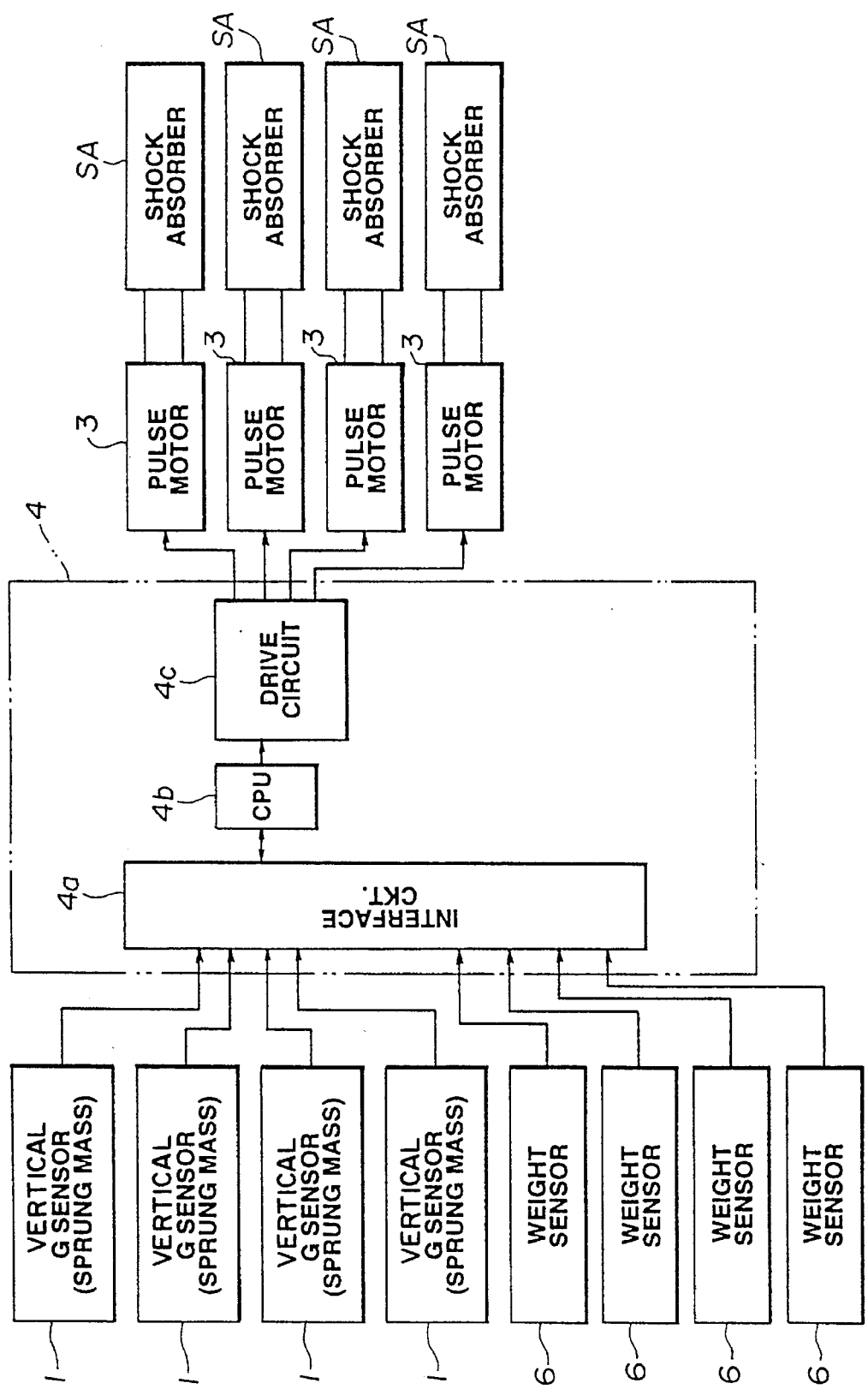
FIG. 2 is a schematic circuit block diagram of the damping force characteristic controlling system in the preferred embodiment shown in FIG. 1.

FIG. 2 shows a circuit block diagram of the damping characteristic controlling system shown in FIG. 1 in the embodiment shown in FIG. 1.

The control unit 4 includes, as shown in FIG. 2, an interface circuit 4a, a CPU 4b, and a drive circuit 4c. The interface circuit 4a receives signals derived from the respective G sensors 1 (sprung mass) and vehicular weight sensors 6.

Figure 13:
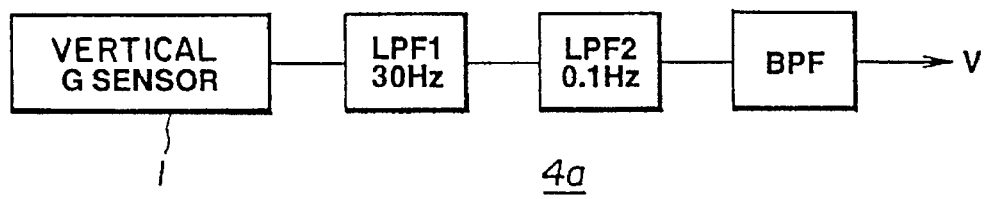
FIG. 13 shows a schematic circuit block diagram of one vertical G (acceleration) sensor and its associated LPF1, LPF2, and BPF circuits in the case of the preferred embodiment shown in FIGS. 1 and 2.

It is noted that, as shown in FIG. 13, the interface circuit 4a includes three couples of filter circuits (LPF1, LPF2, and BPF). The LPF1 serves to eliminate noises having higher frequencies over 30 Hz from the output signal from each corresponding vertical G sensor 1. The LPF2 serves to integrate the signal passed from the LPF1 which indicates the vertical acceleration to output a signal indicating a corresponding vertical velocity of the sprung mass. The BPF is a band pass filter circuit which passes a frequency band including a resonance frequency of the sprung mass to derive the vertical velocity V of the sprung mass as a bouncing component.

Figure 3:
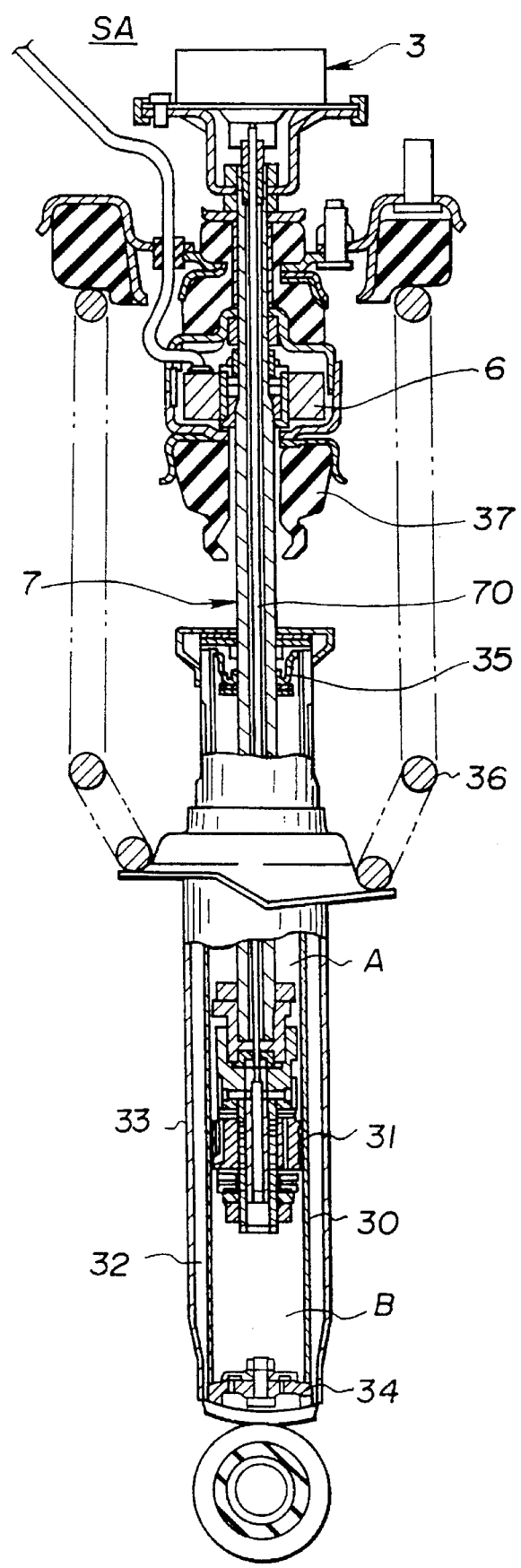
FIG. 3 is a cross sectional view of a representative shock absorber SA used in the preferred embodiment shown in FIGS. 1 and 2.

FIG. 3 shows a cross sectional view of a representative shock absorber SA. The shock absorber SA includes a cylinder 30, a piston 31 defining two chambers, upper chamber A and lower chamber B, an outer envelope 33 which forms a reserve chamber 32 on an outer periphery of the cylinder 30, a base 34 defining the lower chamber B and reserve chamber 32, a guide member 35 which serves as a guide for a slide motion of a piston rod 7 linked to the piston main body 31, a suspension spring 36 interposed between the outer envelope 33 and vehicle body, and a bumper rubber 37. One of each weight sensor 6 shown in FIG. 2 is installed on a position of the piston rod 7 which is below the mounting portion onto the vehicle body.

In FIG. 3, a control rod 70 is penetrated through the piston rod 7 and is rotated (pivoted) by means of the pulse motor 3.

Figure 4:
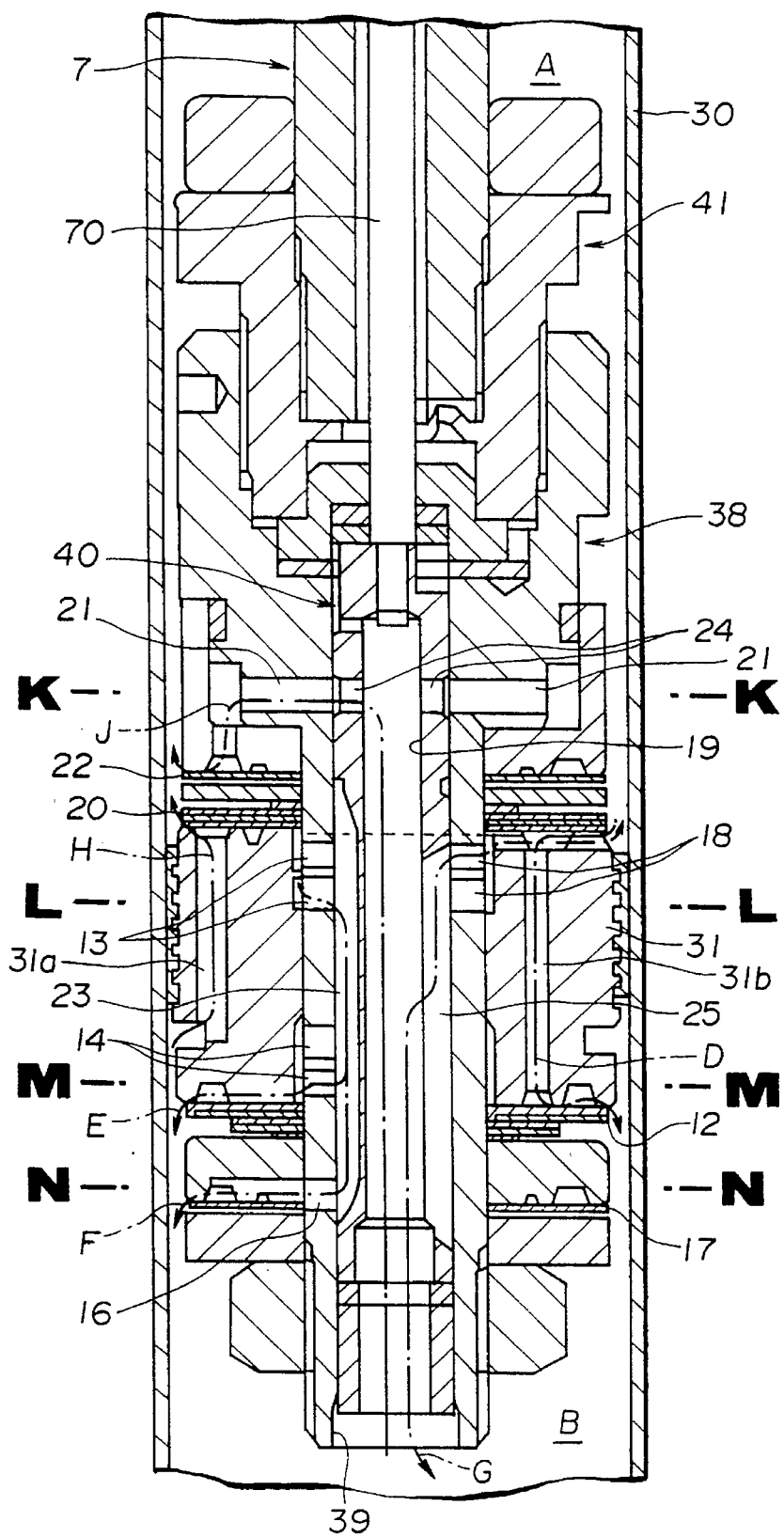
FIG. 4 is an enlarged cross sectional view of the shock absorber, particularly, a piston member and its surrounding components of the shock absorber SA shown in FIGS. 2 and 3.

FIG. 4 shows an enlarged cross sectional view of an essential part of the piston 31.

As shown in FIG. 4, two penetrating holes 31a, 31b are formed in the piston 31 and an extension stroke side damping valve 12 and a compression stroke side damping valve 20 are installed which open and close the corresponding penetrating holes 31a, 31b, respectively. A bounding stopper 41 spirally engaged to a tip of the piston rod 7 is fixed with a stud 38 in the spiral engagement which is penetrated through the piston 31. A communication hole 39 is formed on the stud 38 to form flow passages to communicate a working fluid between the upper chamber A and lower chamber B (extension stroke side second flow passage E, extension stroke side third flow passage F, a bypass passage G, and compression stroke side second flow passage J as will be described later). An adjuster 40 which serves to vary a flow passage cross sectional area is pivotally installed within the communication hole 39. An extension stroke side check valve 17 and a compression (contraction) stroke side check valve 22 are installed on the outer periphery of the stud 38 which enable and interrupt the flow pass at the flow passage formed with the communication hole 39 according to a direction of flow communication of the working fluid.

It is noted that the control rod 70 is linked to the adjuster 40. The stud 38 is formed with first port 21, second port 13, third port 18, fourth port 14, and a fifth port 16 in the upper positional order.

On the other hand, a hollow portion 19 is formed in the adjuster 40, a first lateral hole 24 and second lateral hole 25 being formed therein. A longitudinal groove 23 is formed on an outer periphery of the adjuster 40.

The flow passages through which the working fluid can be communicated between the upper chamber A and lower chamber B at the time of the extension stoke of the piston 31 include: a) an extension stroke side first flow passage D which is provided to pass the working fluid through the penetrating hole 31b and internal side of the opened valve of the extension stroke side damping valve 12 to the lower chamber B; b) the extension stroke side second flow passage E which passes through the second port 13, longitudinal groove 23, and fourth port 14 and which passes through an outer periphery of the opened valve of the extension stroke side damping valve 12; c) the compression (also called, contraction) stroke side third flow passage F which passes through the second port 13, longitudinal groove 23, and fifth port 16 and opened valve of the extension;stroke side check valve 17 and extended toward the lower chamber B; and d) the bypass passage G which passes through the third port 18, second lateral hole 25, and hollow portion 19.

On the other hand, the flow passages through which the working fluid can be communicated between the upper chamber A and lower chamber B at the time of the compression stroke side of the piston 31 includes: a) the compression stroke side first flow passage H which passes through the penetrating hole 31a and opened valve of the compression stroke side damping valve 20; b) the compression stroke side second flow passage J which passes through the hollow portion 19, first lateral hole 24, and first port and the opened valve of the compression stroke side check valve 22 toward the upper chamber A; and c) the bypass passage G which passes through the hollow portion 19, second lateral hole 25, and third port 18 toward the upper chamber A.

That is to say, the shock absorber SA has the damping force characteristic such that the damping characteristic is changeable from a low damping force (soft) to a high damping force (hard) at either of the extension and compression (also called, contraction) stroke sides in response to a pivotal motion of the adjuster 40.

Figure 5:
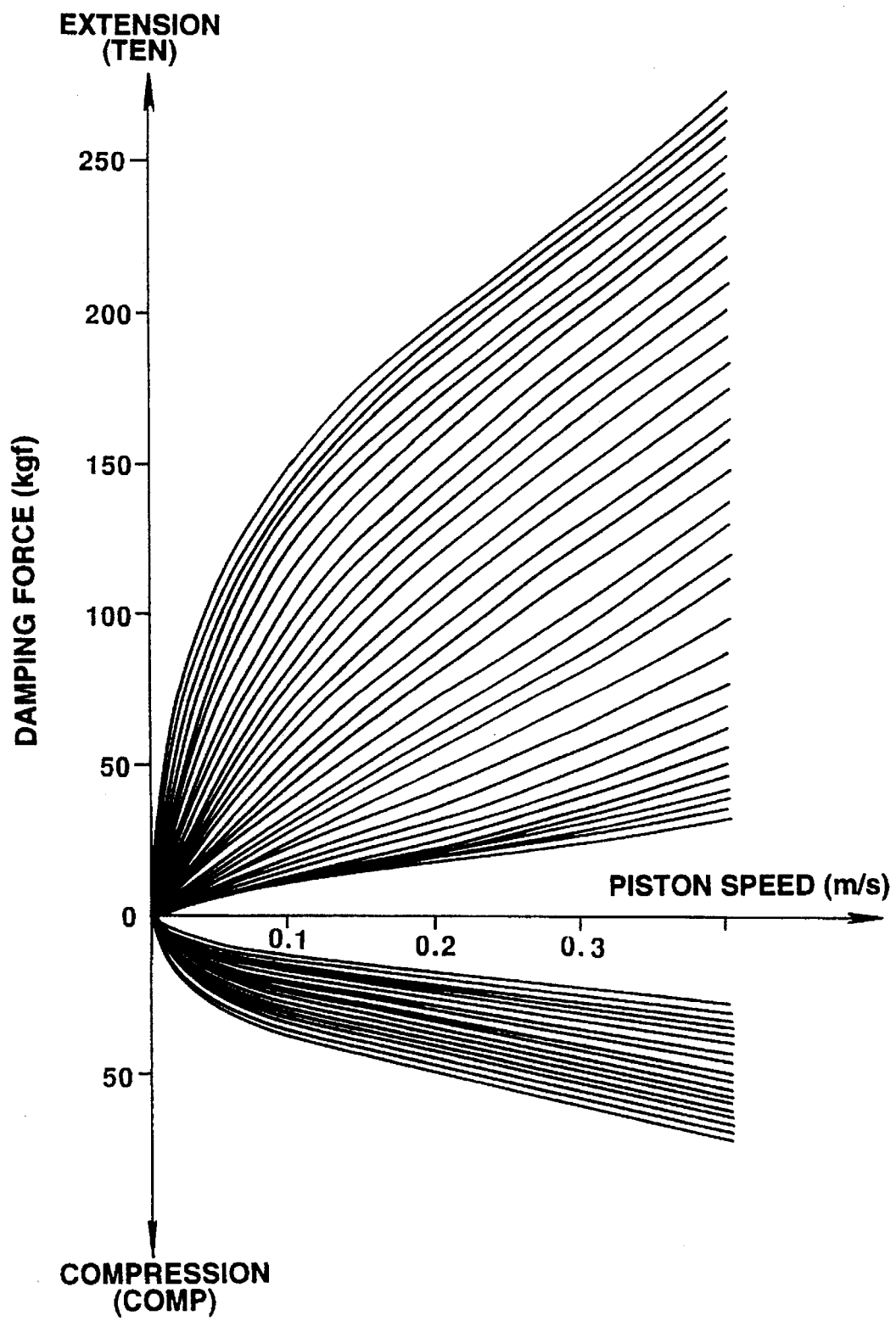
FIG. 5 is a damping force characteristic graph of the shock absorber SA shown in FIGS. 2 through 4.

In the embodiment, the damping force characteristic is so structured as to be able to be proportionally changed at a multiple stage as shown in FIG. 5. Such a characteristic as shown in FIG. 5 is also called a damping coefficient.

As shown in FIG. 6, when the adjuster 40 is pivoted in a counterclockwise direction from a position at which both extension and compression stroke sides provide soft damping forces (hereinafter referred to as the "soft characteristic region SS"), only the damping force at the extension stroke side can be varied at the multiple stage and the compression stroke side is fixed at the low damping coefficient value (hereinafter, called the "extension stroke side hard characteristic region HS").

On the contrary, if the adjuster 40 is pivoted in a clockwise direction, only the compression stroke side provides the multiple stage of damping coefficients but the extension stroke side is fixed to the low damping coefficient (hereinafter referred to as the "compression stroke side hard characteristic region SH").

Figure 7A:
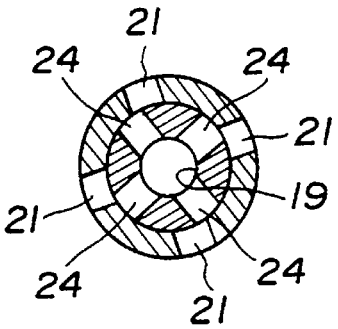
FIGS. 7 (A) through. 7 (C) are lateral cross sectional views cut away along a line K—K of FIG. 4.
Figure 7B:
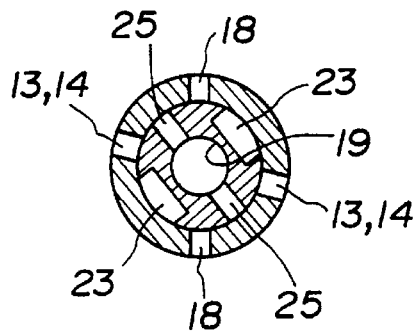
Figure 7C:
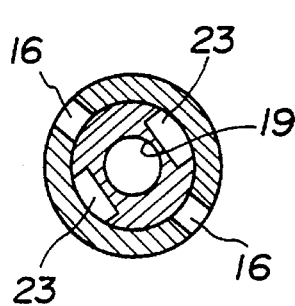
Figure 8A:
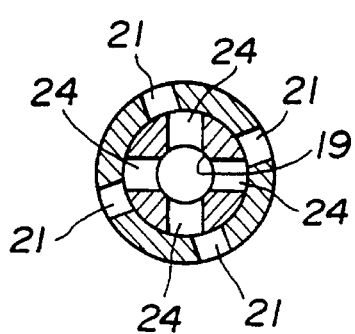
FIGS. 8 (A) through 8 (C) are lateral cross sectional views cut away along a line L—L and along a line M—M of FIG. 4.
Figure 8B:
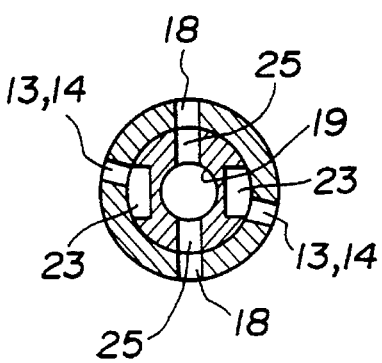
Figure 8C:
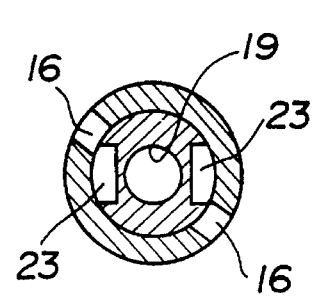
Figure 9A:
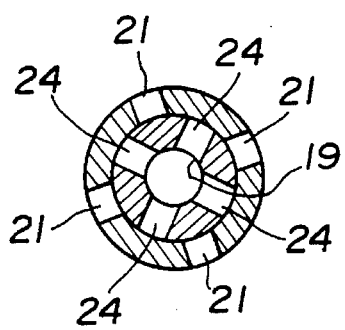
FIGS. 9 (A) through 9 (C) are lateral cross sectional views cut away along a line N—N of FIG. 4.
Figure 9B:
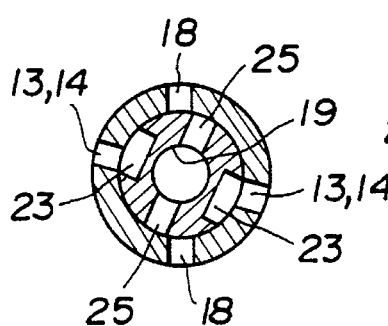
Figure 9C:
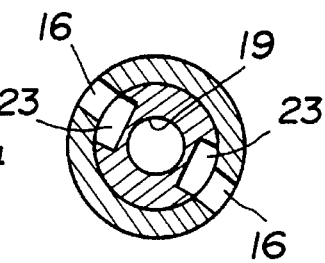

In FIG. 6, when the adjuster 40 is positioned at pivoted positions of ①, ②, and ③, the cross section of the piston cut way along the line K—K are shown in FIGS. 7 (A), 7 (B), and 7 (C), respectively, those the lines L—L and M—M are shown in FIGS. 8 (A) through 8(C), respectively, and those along the line N—N are shown in FIGS. 9(A) through 9(C), respectively.

Figure 10:
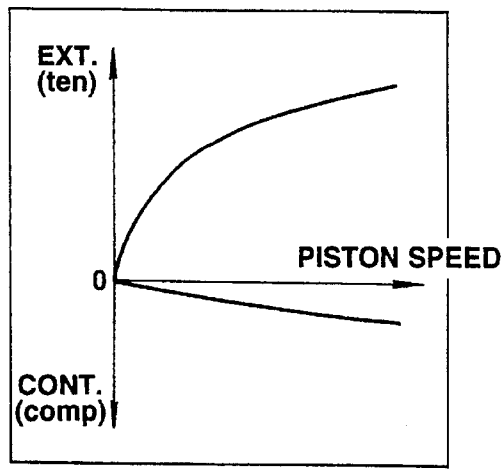
FIG. 10 shows characteristic curves of damping forces when the extension stroke side is set to a high damping force characteristic (Hard region; HS).
Figure 11:
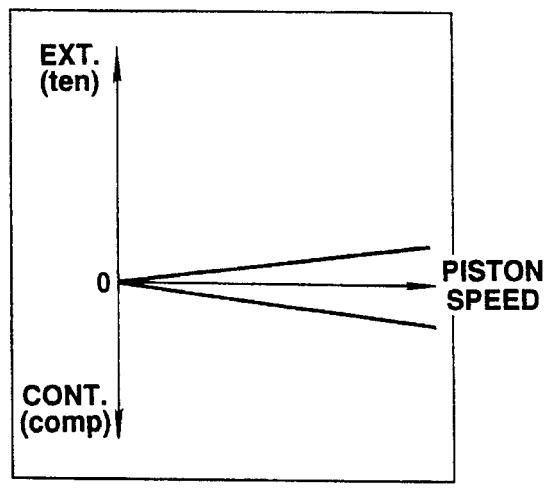
FIG. 11 shows characteristic curves of damping forces when both extension and contraction stroke sides are in the low damping characteristic (soft regions; SS).
Figure 12:
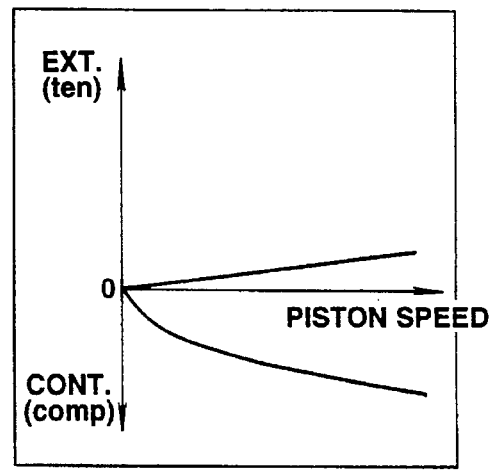
FIG. 12 shows characteristic curves of damping forces when the contraction stroke side is set to the high damping characteristic (hard region; SH).

FIGS. 10, 11, and 12 show characteristics of the damping forces at the respective positions of ①, ②, and ③ shown in FIG. 6.

Figure 14:
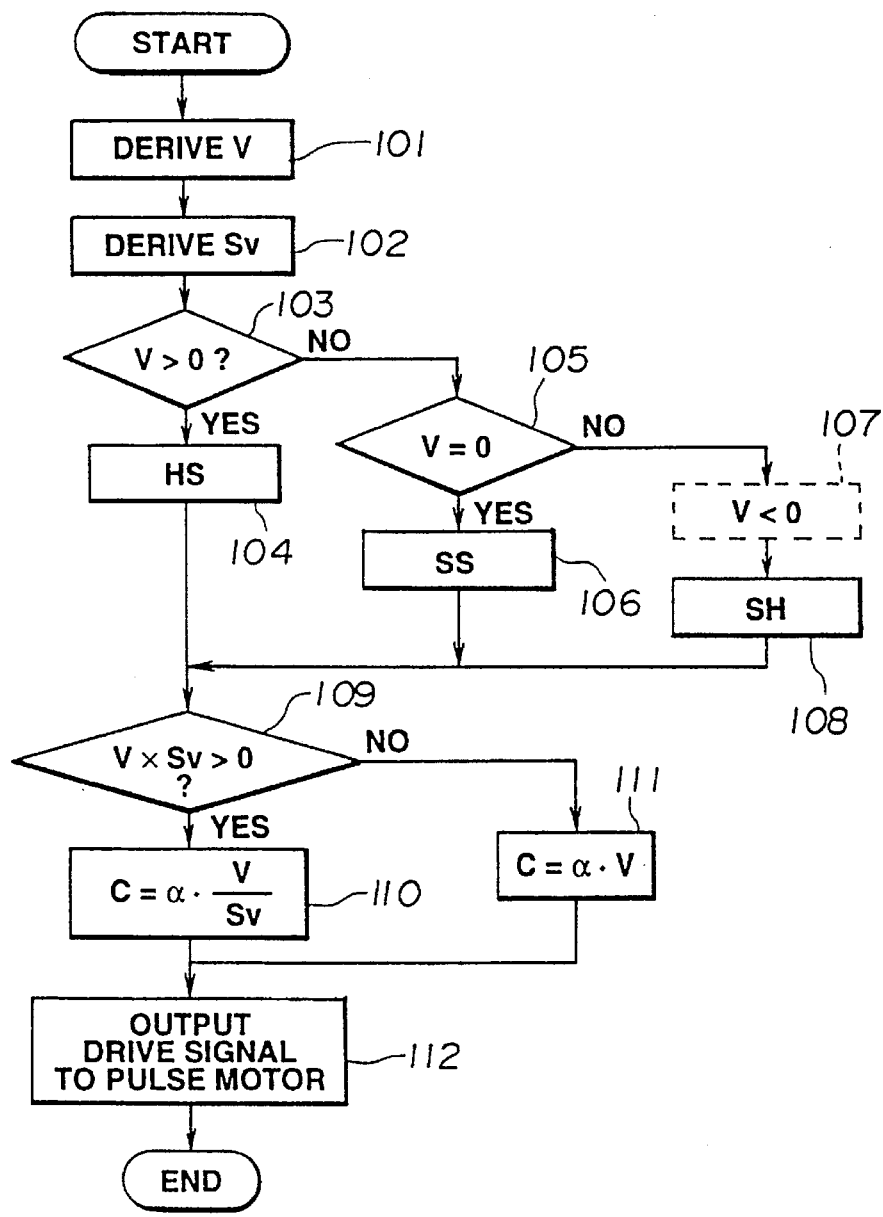
FIG. 14 is an operational flowchart executed by a control unit shown in FIGS. 1 and 2 in the case of the embodiment according to the present invention.

FIG. 14 shows an operational flowchart executed by the control unit 4 which controls the drive of the pulse motor 3 so as to control the damping force for each or any one of the shock absorbers SA. It is noted that the program routine shown in FIG. 14 is executed for each shock absorber SA, independently.

At a step 101, the CPU 4b reads the sprung mass vertical accelerations from one of the sprung mass vertical G sensors 1 located at the corresponding one of tire wheels to derive the vertical sprung mass velocity V.

At a step 102, the CPU 4b reads a relative displacement between the sprung mass and unsprung mass from the corresponding one vehicular weight sensor 6 to derive a relative velocity Sv between the sprung mass and unsprung mass.

At a step 103, the CPU 4b determines whether the vertical sprung mass velocity V has a direction of plus (namely, upward). If Yes at the step 103, the routine goes to a step 104. If No at the step 103, the routine goes to a step 105.

At the step 104, the shock absorber SA is controlled toward the extension stroke side hard region HS.

At the step 105, the CPU 4b determines whether the vertical sprung mass velocity V is zero (V=0). If Yes at the step 105, the routine goes to a step 106. If No at the step 105, the routine goes to a step 107.

At the step 106, the shock absorber SA is controlled in both of the compression and extension soft regions SS.

At the step 107, the CPU 4b determines whether the vertical sprung mass velocity V is minus (V<0) and the routine goes to a step 108 in which the shock absorber SA is controlled in the contraction stroke hard region SH.

After passing through one of the steps 104, 106, and 107, the routine goes to a step 109.

At the step 109, the CPU 4b determines whether a product of the vertical sprung mass velocity V and the relative velocity Sv is larger than zero (V·Sv >0). If Yes at the step 109, the routine goes to a step 110. If No (V·Sv≦0) at the step 109, the routine goes to a step 111.

At the step 110, the CPU 4b calculates the damping characteristic at the controlled stroke side C as C=α·V/Sv. On the other hand, at the step 111, the CPU 4b calculates the damping characteristic at the controlled stroke side C as C=α·V, wherein α denotes a proportional constant.

Next, at a step 112, the control unit 4b commands the drive circuit 4c to output a drive signal to the corresponding one of the pulse motors 3 to control the damping characteristic at the controlled stroke side determined at either the step 110 or 111.

Figure 15:
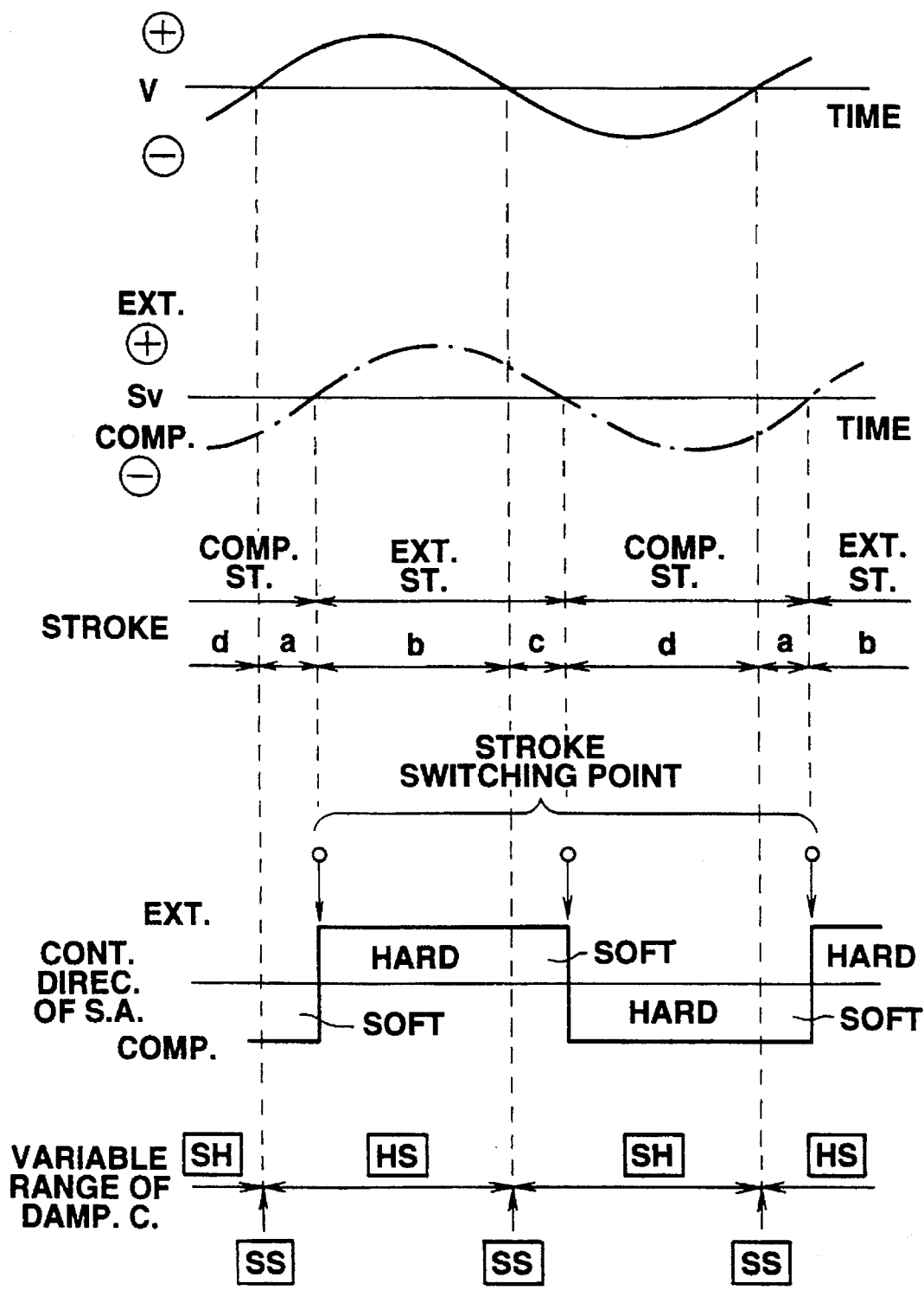
FIG. 15 is integrally a timing chart of each signal derived in the preferred embodiment shown in FIGS. 1 and 2 when the control region of the damping characteristic is switched.

FIG. 15 shows a timing chart for explaining the content of switching the control regions executed by the control unit 4.

That is to say, in a case where the vertical sprung mass velocity V is varied as shown in FIG. 15 and when the vertical sprung mass velocity V is passed through zero, the shock absorber SA is controlled to the damping characteristic at the extension and contraction stroke sides as the soft region SS.

Next, when the vertical sprung mass velocity V indicates a positive value (upward with respect to the road surface), the shock absorber SA is controlled to the extension stroke side hard region HS, that is to say, the contraction stroke side is fixed to the soft region and damping characteristic of the extension stroke side is variably controlled.

In addition, in a case where the vertical sprung mass velocity V indicates a negative value (downward), the contraction stroke side is controlled to the contraction stroke side hard region SH such that the damping characteristic of the contraction stroke side is variably controlled and that of the extension stroke side is fixed to the low damping characteristic (soft).

In FIG. 15, a region a denotes a state wherein the vertical sprung mass velocity V is inverted from the negative (minus) value (downward) to the positive (plus) value (upward). At this time, the region a denotes a state wherein the relative velocity Sv still indicates the negative value (controlled side is the contraction stroke side of the shock absorber SA at this time). The extension stroke side of the shock absorber SA at this time is controlled at the extension stroke side hard region HS on the basis of the direction of the vertical sprung mass velocity V. Hence, at the region a, the contraction stroke side is in the soft damping characteristic and the extension stroke side is variably controlled toward the maximum damping force characteristic.

Next, since a region b denotes a region in which the vertical sprung mass velocity V remains a positive value (upward) and in which the relative velocity Sv is switched from the negative value to the positive value (extension stroke side of the shock absorber to be controlled), the shock absorber SA is controlled to the extension stroke side hard region HS on the basis of the direction of the vertical sprung mass velocity V and the controlled stroke side is the extension stroke side. Hence, at the region b, the extension stroke side is variably controlled at the hard characteristic side.

In addition, a region c denotes a state in which the vertical sprung mass velocity V is switched from the positive value (upward) to the negative value (downward). At this time, the relative velocity Sv is in a region which still indicates the positive value (extension stroke side of the shock absorber SA). The contraction stroke side of the shock absorber SA is controlled to the compression (contraction) stroke side hard region SH on the basis of the direction of the vertical sprung mass velocity V. Hence, at the region c, the extension stroke side is in the soft characteristic and the variable control of the damping characteristic is carried out at the contraction stroke side toward the maximum damping force characteristic.

On the other hand, a region j denotes a region in which the vertical sprung mass velocity V still remains the negative value (downward) and the relative velocity indicates the positive value from the positive value (extension stroke side of the shock absorber SA). At this time, the contraction stroke side is controlled in the contraction stroke side hard region SH on the basis of the direction of the vertical sprung mass velocity V and the controlled stroke side is in the contraction stroke side. Hence, the contraction stroke side is variable controlled at the hard characteristic side.

As described above, in the embodiment, when the direction determining signs of both vertical sprung mass velocity V and relative velocity Sv are the same (region b and region d), the control unit 4 is operated to control the damping characteristic of the shock absorber SA at the sprung mass side, i.e., either the extension stroke side or contraction stroke side to the hard characteristic. When the direction determining signs of both V and Sv are mutually different (region a and region c), the control unit 4 is operated to fix the damping characteristic of the shock absorber SA at the unsprung mass side to the soft characteristic. In this way, the embodiment carries out the same damping characteristic control as that based on the "sky hook" theory. Furthermore, the switching of the damping characteristic without drive of the pulse motor 3 when the region is transferred from the region a to the region b and from the region c to the region d.

Next, a specific content of the variable control of the damping characteristic will be explained with reference to FIG. 16.

Figure 16:
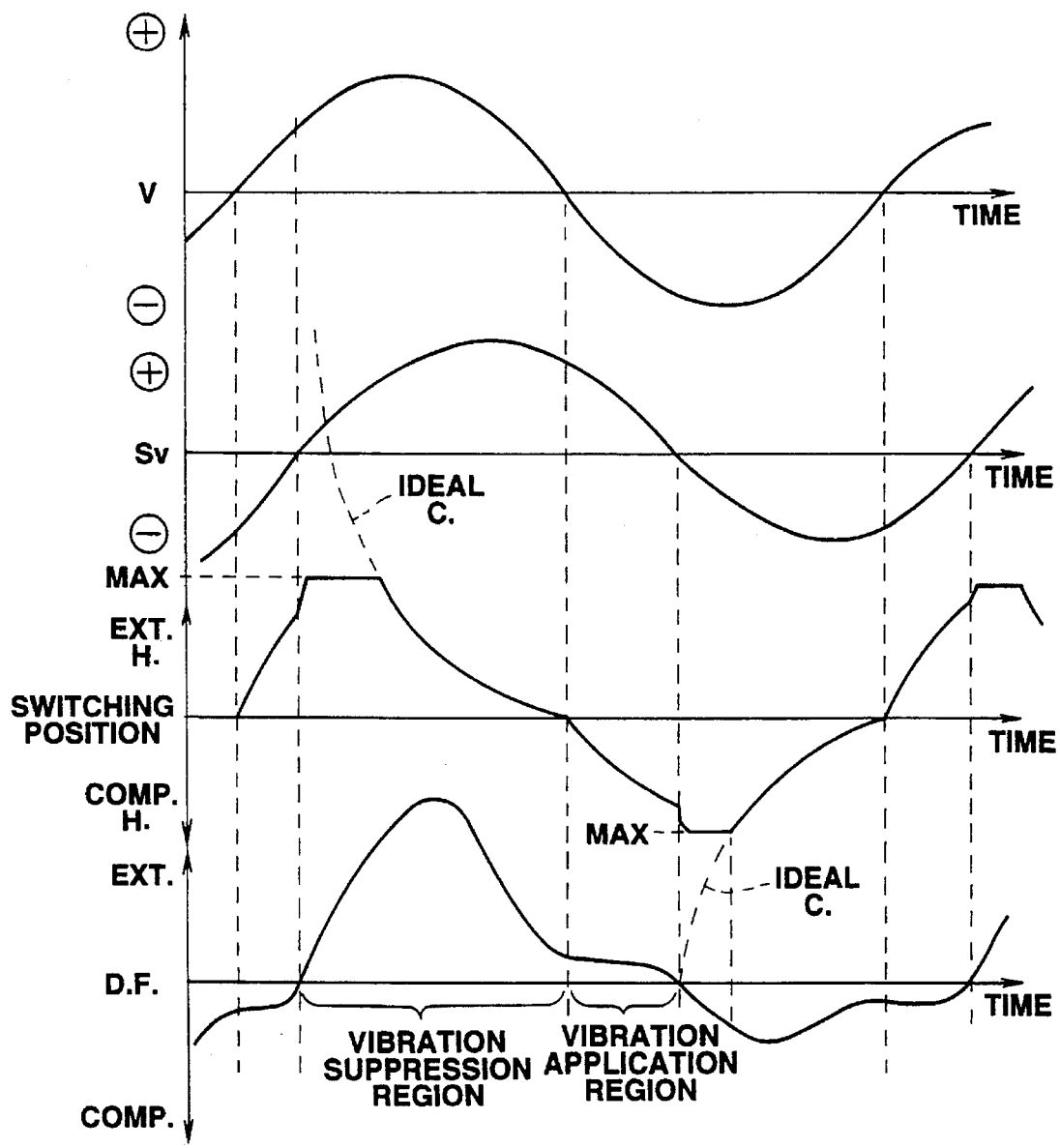
FIG. 16 is integrally a timing chart in which a specific content of the damping force characteristic variable control of a control unit shown in FIG. 2.

As shown in FIG. 16, when the direction of the vertical sprung mass velocity V is upward (indicates the plus value) and the relative velocity between the sprung mass and unsprung mass Sv is downward (negative value), the contraction stroke side is fixed to the soft (low) damping characteristic and its opposite stroke side, namely, the extension stroke side is controlled to provide the damping characteristic C which is proportional to the magnitude of the vertical sprung mass velocity V ($C=\alpha \cdot V$). That is to say, since at a point of time at which the direction of the vertical sprung mass velocity V is switched from the downward direction to the upward direction, the variable control of the damping characteristic at the extension stroke side which is opposite to the contraction stroke side at which the variable control thereof has been carried out is started, the switching position of the damping characteristic at the extension stroke side is already switched to the position near to the switching position at which the damping characteristic proportional to the value (magnitude) of the vertical sprung mass velocity V. Hence, the sufficient vibration suppression effect from an initial stage at which the relative velocity Sv is switched to the extension stroke direction.

Next, when the direction of the relative velocity Sv is switched from the contraction stroke direction (negative value) to the extension stroke direction [(positive value, the direction of the vertical sprung mass velocity V still indicating the positive value (upward)], the damping characteristic C of the extension stroke side which is the controlled stroke side of the shock absorber SA is controlled as $C=\alpha \cdot V/Sv$. That is to say, since at a point of time at which the direction of the relative velocity Sv is switched from the contraction stroke direction (negative value) to the extension stroke direction (positive value), the value of the relative velocity Sv is zero, the value of the damping characteristic C (in calculation, infinite) is in the maximum hard (hardest) state, thereafter, the damping characteristic is started to move toward the downward direction from a predetermined stage of time, and, finally, the damping characteristic is variably controlled and, thereafter, in the minimum soft (lowest) characteristic at the point of time at which the direction of the vertical sprung mass velocity V is switched from the upward direction to the downward direction. Hence, the sufficient vibration application suppression effect can be achieved from the initial stage at which the direction of the vertical sprung mass velocity V is switched to the downward direction.

On the contrary, when the direction of the longitudinal sprung mass velocity V is downward (minus) and the relative velocity Sv is upward (plus), the extension stroke of the shock absorber SA is fixed to the soft characteristic. On the other hand, the damping characteristic (switching position) C at the contraction stroke side is controlled as $C=\alpha \cdot V$ (relative velocity). In this case, the sufficient vibration suppression effect from the initial stage at which the relative velocity Sv is switched to the contraction stroke direction can be achieved.

Next, when the direction of the relative velocity Sv is switched from the extension stroke direction (positive value) to the contraction stroke direction (negative value), the direction of the vertical sprung mass velocity V indicating the downward direction (negative value), the damping characteristic (switching position) C at the contraction stroke side is controlled as $C=\alpha \cdot V/Sv$. In this case, the sufficient vibration application suppression effect from the initial stage at which the direction of the vertical sprung mass velocity is switched to the upward direction can be achieved.

As described above, the embodiment has the following effect:

① The reduction of the control efficiency can be eliminated due to the response delay when the switching of the damping characteristic is carried out on the basis of the "sky hook" theory.

② The frequency at which the switching of the damping characteristic becomes few as compared with the damping characteristic based on the "sky hook" theory. Hence, the control responsive characteristic can be enhanced and the durability of the pulse motor(s) 3 can be improved.

It is noted that, although in the embodiment the weight sensors are used as the relative velocity detecting means, the stroke sensors, vehicle height sensors and other well known means may alternatively be used.

As described hereinabove, in the system and method for controlling a damping characteristic for the shock absorber of the vehicle according to the present invention, the sufficient vibration suppression effect from the initial stage at which the direction of the relative velocity Sv is switched can be achieved and the sufficient vibration application suppression effect from the initial stage at which the vertical sprung mass velocity is switched can be achieved. Thus, disadvantages of response delay in the switching time at which the damping characteristic is switched can be eliminated.

The frequency of the switching of the damping characteristic can become few to enhance the control responsive characteristic and the durability of the actuator can be improved.

The foregoing description has been made in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A system for controlling a damping force characteristic for at least one shock absorber of an automotive vehicle, said shock absorber interposed between a sprung mass of a vehicle body and unsprung mass of a corresponding one of its tire wheels, the system comprising:

a) damping characteristic varying means, responsive to a drive signal input thereto, for variably changing a damping force characteristic of one of an extension stroke side and a contraction stroke side with a damping force characteristic of the other one of the extension stroke side and the contraction stroke side fixed to a low damping force characteristic;

b) first sensing means for deriving a magnitude and direction of a vertical sprung mass velocity with respect to a road surface on which the vehicle runs;

c) second sensing means for deriving a relative velocity between the sprung mass and unsprung mass; and d) damping characteristic control means for determining whether the direction of the vertical sprung mass velocity is equal to the direction of the relative velocity between the sprung mass and unsprung mass and for providing the drive signal to the damping characteristic varying means to control the damping force characteristic of said one of the extension stroke side and the contraction stroke side to a damping characteristic which is proportional to the magnitude of the vertical sprung mass velocity divided by the magnitude of the relative velocity when the direction of the vertical sprung mass velocity is equal to direction of the relative velocity and to a damping characteristic which is proportional to the magnitude of the vertical sprung mass velocity when the direction of the vertical sprung mass velocity is not equal to the direction of the relative velocity.

2. A system for controlling a damping force characteristic of at least one shock absorber of an automotive vehicle, said shock absorber interposed between a sprung mass of a vehicle body and unsprung mass of a corresponding one of its tire wheels as set forth in claim 1, wherein when the direction of the vertical sprung mass velocity (V) is plus (+) and the direction of the relative velocity (Sv) is plus (+), the plus meaning that the direction with respect to the road surface is vertically upward, the damping characteristic of the extension stroke side is controlled as C= $\alpha$V/Sv, and when the direction of the vertical sprung mass velocity (V) is minus (−) and relative velocity (Sv) is minus (−), the minus meaning that the direction with respect to the road surface is vertically downward, the damping characteristic of the contraction stroke side is controlled as C=$\alpha$V/Sv, when the direction of the vertical sprung mass velocity (V) is plus (+) and the direction of the relative velocity (Sv) is minus (−), the damping force characteristic of the extension stroke side is controlled as C= $\alpha\cdot$V, and when the direction of the longitudinal sprung mass is (−) and the direction of the relative velocity is plus (+), the damping force characteristic at the contraction stroke side is controlled as C=$\alpha\cdot$V, wherein $\alpha$ denotes a proportional constant.

3. A system for controlling a damping force characteristic for at least one shock absorber of an automotive vehicle, said shock absorber interposed between a spring mass of a vehicle body and unsprung mass of a corresponding one of its tire wheels as set forth in claim 2, wherein when the damping characteristic is controlled as C=$\alpha\cdot$V/Sv, the damping characteristic at the other stroke side of either the extension or contraction stroke side is fixed to the low damping characteristic.

4. A system for controlling a damping force characteristic for at least one shock absorber of an automotive vehicle, said shock absorber interposed between a sprung mass of a vehicle body and unsprung mass of a corresponding one of its tire wheels as set forth in claim 3, wherein said damping characteristic varying means comprises a pulse motor.

5. A system for controlling a damping force characteristic for at least one shock absorber of an automotive vehicle, said shock absorber interposed between a sprung mass of a vehicle body and an unsprung mass of a corresponding one of its tire wheels as set forth in claim 4, wherein said first sensing means comprises: a vertical acceleration sensor which is so constructed as to detect the vertical acceleration of the sprung mass and produce a vertical acceleration signal indicative thereof; and vertical sprung mass velocity deriving means for integrating the vertical sprung mass acceleration to derive the vertical sprung mass velocity and second sensing means comprises a weight sensor installed on the vehicle body adjacent to the position of the shock absorber.

6. A method for controlling a damping force characteristic for at least one shock absorber of an automotive vehicle, said shock absorber interposed between a sprung mass of a vehicle body and unsprung mass of a corresponding one of its tire wheels, the method comprising the steps of:

a) deriving a direction and magnitude of a vertical sprung mass velocity (V) and deriving a direction and magnitude of a relative velocity between the sprung mass and unsprung mass (Sv):

b) determining whether the direction of the vertical sprung mass velocity is equal to the direction of the relative velocity between the sprung mass and unsprung mass;

c) controlling a damping force characteristic of the shock absorber at one of an extension stroke side and a contraction stroke side to a damping characteristic which is proportional to the vertical sprung mass velocity (V) divided by the relative velocity (Sv) between the sprung mass and unsprung mass when both directions of the vertical sprung mass velocity (V) and relative velocity (Sv) coincide with each other and to a damping characteristic which is proportional to the vertical sprung mass velocity (V) at said one of the extension stroke side or contraction stroke side when the direction of the vertical sprung mass velocity does not coincide with that of the relative velocity; and d) maintaining a damping characteristic of the shock absorber at the other of the extension and contraction stroke sides at a low damping characteristic.

\* \* \* \* \*